(12) United States Patent
Chen et al.

(10) Patent No.: US 6,992,410 B2
(45) Date of Patent: Jan. 31, 2006

(54) COOLING SYSTEM FOR MOTORS

(75) Inventors: Wen Chen, Singapore (SG); Huai Xin Niu, Singapore (SG)

(73) Assignee: ASM Technology Singapore PTE LTD, Singapore (SG)

( * ) Notice: Subject to any disclaimer, the term of this patent is extended or adjusted under 35 U.S.C. 154(b) by 176 days.

(21) Appl. No.: 10/426,081

(22) Filed: Apr. 29, 2003

(65) Prior Publication Data

US 2004/0217656 A1 Nov. 4, 2004

(51) Int. Cl.
*H02K 9/00* (2006.01)

(52) U.S. Cl. .......................................... 310/52; 310/12
(58) Field of Classification Search ............. 310/12–14, 310/52–59
See application file for complete search history.

(56) References Cited

U.S. PATENT DOCUMENTS

| 5,834,862 | A | | 11/1998 | Hartzell, Jr. | |
| 5,998,889 | A | * | 12/1999 | Novak | 310/12 |
| 6,300,691 | B1 | * | 10/2001 | Hwang et al. | 310/12 |
| 6,545,377 | B2 | * | 4/2003 | Bisschops | 310/52 |

* cited by examiner

*Primary Examiner*—Thanh Lam
(74) *Attorney, Agent, or Firm*—Ostrolenk, Faber, Gerb & Soffen, LLP

(57) ABSTRACT

The invention provides a cooling system and method for a motor having a movable component, which may be a moving coil bracket of a linear motor. The system comprises a fluid transmission tube extending adjacent to a heat-emitting surface of the movable component to direct a cooling fluid over the heat-emitting surface, wherein the fluid transmission tube is adapted to move in conjunction with the movable component of the motor.

20 Claims, 3 Drawing Sheets

COOLING SYSTEM FOR MOTORS

FIELD OF THE INVENTION

The present invention relates to a system and method for cooling motors, and in particular, using fluid-cooling means to cool motors.

BACKGROUND AND PRIOR ART

Motors are widely used to drive semiconductor packaging equipment, such as wire-bonders in wire-bonding machines. Linear motors are generally preferred to drive wire-bonders as they offer fast and precise motion. During such driving motion, a large amount of heat may be generated, whether due to a large current flowing through the motor or a significantly large resistance in the coil wires because of the compact size of the motor. Cooling is critical not only to prolong the useful life of the motor but also to maintain its performance.

Electrical fans are commonly used to cool most equipment in the industry. However, although electrical fans are useful for external cooling, they are insufficient to cool internal components of linear motors, which generate and retain the most heat. In the case of linear motors comprising a coil disposed between a pair of magnets, there are small gaps between the coil and magnets. These gaps are not easily accessible to cooling air generated from an electrical fan. A practice has thus developed of trying to guide cooling air into the said gaps.

One way of guiding cooling air into the said gaps is to drill holes and nozzles inside a moving coil bracket of a linear motor, and to channel cooling air through these holes and nozzles. The problem is that if the material of the coil bracket is not metallic or its machining property is poor, drilling long holes and nozzles inside the coil bracket is expensive and sometimes may not be possible. It would also increase the moving mass of the motor if additional material is formed in the coil bracket to house such holes and nozzles. Another way is to drill air nozzles on a stator of the motor. This also has limitations because such nozzles generally direct compressed air along only one axis. If in use, the moving coil moves along another axis, some portion of the cooling air will not reach the coil surface when the coil bracket moves away from the nozzle, and cooling air is wasted.

Yet another method of implementing a cooling system in a linear motor is found in U.S. Pat. No. 5,834,862 for a "Linear Motor Cooling System". This patent discloses a nozzle mounted on one end of a moving coil bracket for producing two high velocity sheets of air which are directed horizontally over the surfaces of the coil so as to bring down the temperature of the coil. This cooling structure is located outside the magnets of the linear motor and is not efficient especially if the coil area is large. Moreover, this patent disclosure introduces cooling air from one end of a coil bracket without proper sealing, allowing some of the cooling air to escape into the atmosphere. Furthermore, the nozzle area is relatively large, which serves to reduce the air pressure of the cooling air and reduces its ability to reach more remote areas of the coil. It may also not be effective if the whole coil bracket is designed to move in both the X- and Y-axes.

SUMMARY OF THE INVENTION

It is therefore an object of the invention to seek to provide an improved apparatus and method to increase cooling efficiency of cooling air introduced to cool a motor.

According to a first aspect of the invention, there is provided a cooling system for a motor having a movable component comprising a fluid transmission tube extending adjacent to a heat-emitting surface of the movable component to direct a cooling fluid over the heat-emitting surface, wherein the fluid transmission tube is adapted to move in conjunction with the movable component of the motor.

According to a second aspect of the invention, there is provided a method for cooling a motor having a movable component comprising the steps of arranging a fluid transmission tube so that it extends adjacent to a heat-emitting surface of the movable component, supplying a cooling fluid into the fluid transmission tube and directing the cooling fluid over the heat-emitting surface, wherein the fluid transmission tube moves in conjunction with the movable component of the motor.

It will be convenient to hereinafter describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

An example of a system and method in accordance with the invention will now be described with reference to the accompanying drawings, in which.

DETAILED DESCRIPTION OF THE PREFERRED EMBODIMENT

Figure 1:
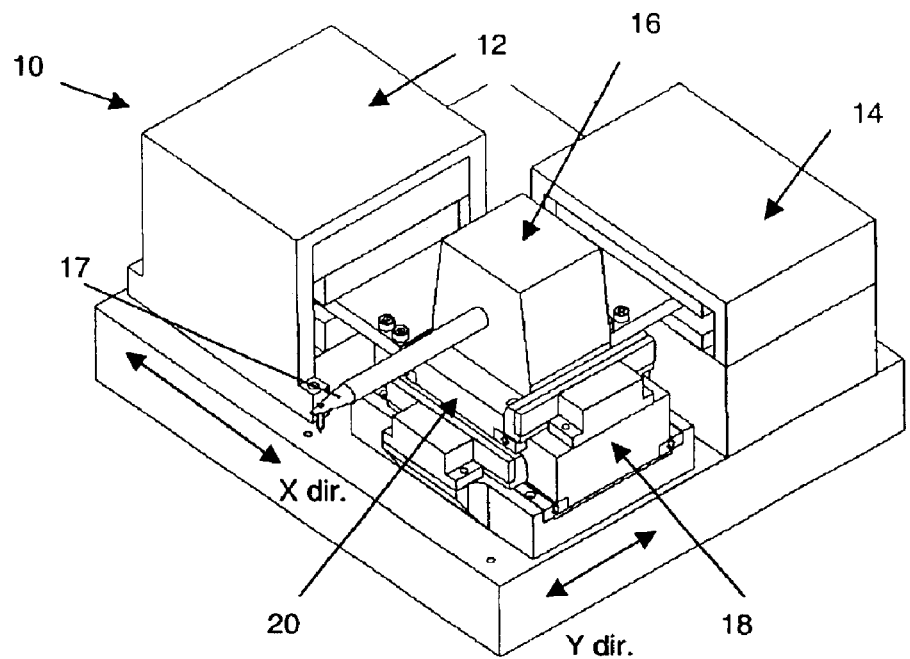
FIG. 1 is an isometric view of a typical X-Y table.

FIG. 1 is an isometric view of a typical X-Y table 10. The X-Y table 10 has driving components in the form of an X motor 12 and a Y motor 14. The X motor 12 and Y motor 14 comprise moving coil linear motors, and drive a bond head 16 in the X-axis and Y-axis respectively. An ultrasonic transducer 17 is attached to the bond head 16 to carry out wire-bonding of electronic components. Typically, wire-bonders bond conductive wires to make electrical connections between contact pads of a semiconductor chip and a leadframe to which the chip is attached.

The bond head 16 is mounted on a Y stage 20 which is in turn mounted on an X stage 18. The X stage 18 is driven by the X motor 12 whereas the Y stage 20 is driven by the Y motor 14. The X stage 18 usually moves only along an X-axis whereas the Y stage 20, which is on top of the X stage 18, usually moves in both the X- and Y-axes. A combination of movement of the X stage 18 and Y stage 20 allows a tip of the ultrasonic transducer 17 to be positioned at various positions on a horizontal plane for the purpose of wire-bonding.

Figure 2:
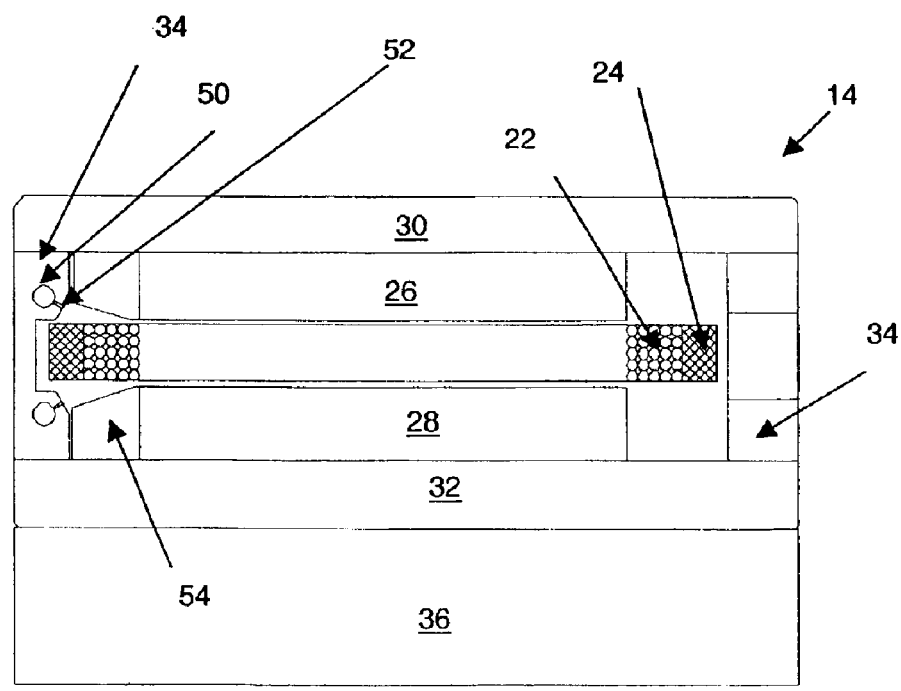
FIG. 2 is a cross-sectional view of a moving coil motor with a cooling system of the prior art.

FIG. 2 is a cross-sectional view of a moving coil linear motor 12 with a cooling system of the prior art. This is an example of a cooling system comprising air channels 50 drilled in a motor support 34 to introduce cooling air into the motor 12. The linear motor generally comprises coils 22 that are embedded in a coil bracket 24. The coil bracket 24 is usually made of a non-metallic material and one or more coils 22 are embedded in the material. The coils 22 and coil bracket 24 are disposed between a top magnet 26 and a bottom magnet 28, leaving small gaps between the coils 22 and coil bracket 24 and the top and bottom magnets 26, 28. There are further layers of a top iron plate 30 and a bottom iron plate 32 adjacent to the top and bottom magnets, 26, 28. The bottom iron plate 32 rests on a motor base 36 and a motor support 34 supports the top iron plate 30.

When a current is passed through the coils 22, electromagnetic interaction between the coils 22 and the top and bottom magnets 26, 28 produce motion of the coils 22 and coil bracket 24 relative to the magnets 26, 28. An X-stage 18 attached to the coil bracket 24 is moved with it.

In this prior art embodiment, air channels 50 are drilled into the motor support 34. Air outlets 52 that lead to the air channels 50 are formed on surfaces of the motor support 34 adjacent to top and bottom surfaces of the coils 22 and coil bracket 24. Air guides 54 are formed in the motor 12 next to the air outlets 52 to receive cooling air and guide it through the gaps between the coils 22 and coil bracket 24 and top and bottom magnets 26, 28 to cool the surfaces of the coils 22. A disadvantage of this design is that the position of air cooling is fixed on the motor support 34 while the coils 22 are movable. Thus, some portion of the air may not reach the coil surfaces. It is even worse if this cooling structure is applied on a Y motor, where the coil bracket moves in both the X- and Y-axes. In order to allow the coils bracket 24 to move in both axes, the coil bracket 24 must be made much narrower or the motor must be much wider. Thus the air guide 54 would be useless. Most of the cooling air cannot get into the gaps between the coils 22 and the magnets 26, 28 when the bracket 24 moves away from the air guides. Thus, the cooling efficiency is not high.

Figure 3:
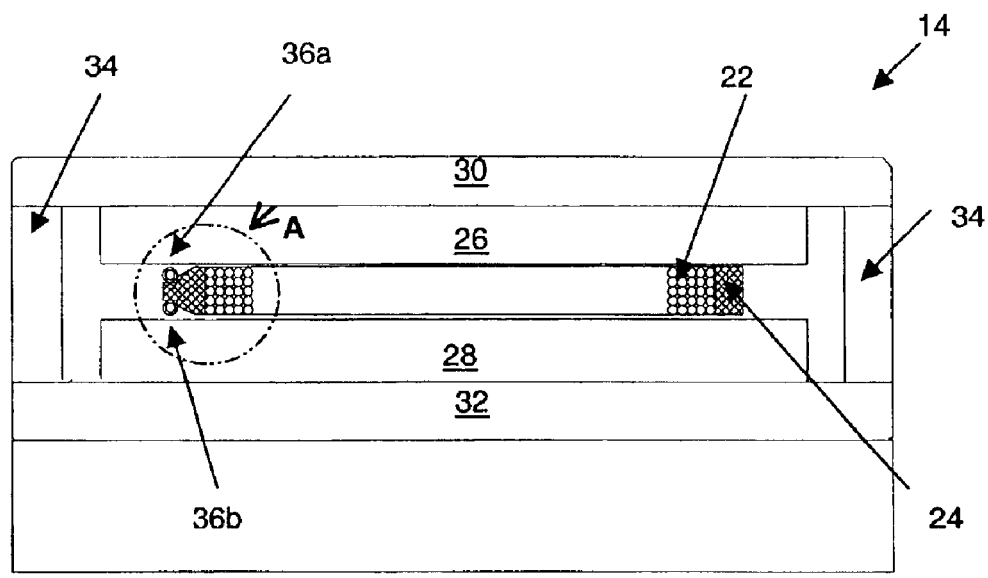
FIG. 3 is a cross-sectional view of a moving coil motor incorporating a cooling system comprising fluid transmission tubes according to the preferred embodiment of the invention.

FIG. 3 is a cross-sectional view of a motor with a movable component, such as a moving coil motor 14, incorporating a cooling system comprising fluid transmission tubes 36a, 36b according to the preferred embodiment of the invention. The motor 14 comprises coils 22 embedded in a coil bracket 24 disposed between top and bottom magnets 26, 28 and top and bottom iron plates 30, 32 as described above. The top and bottom magnets 26, 28 form a magnetic field in which the coils 22 of the coil bracket 24 are disposed. However, instead of air channels drilled in the motor support 34, the preferred embodiment of the invention utilizes fluid transmission tubes in the form of air tubes 36a, 36b mounted to the coil bracket 24 instead.

The air tubes 36a, 36b extend along a length of the coil bracket 24 and carry a cooling fluid, such as compressed air. They may be mounted onto the coil bracket 24, whether by the use of adhesives, mounting brackets or any other means. One air tube 36a is mounted adjacent to a top surface of the coil bracket 24, and another air tube 36b is mounted adjacent to a bottom surface of the coil bracket 24. The top and bottom surfaces help direct air onto heat-emitting surfaces of the coils 22, which carry electrical current, as now explained. The air tubes 36a, 36b extend adjacent to the heat-emitting surfaces and move in conjunction with the coils 22 and coil bracket 24 to introduce a consistent amount of compressed cooling air directly to the top and bottom heat-emitting surfaces of the coils 22 regardless of the position of the coil bracket 24.

Figure 4:
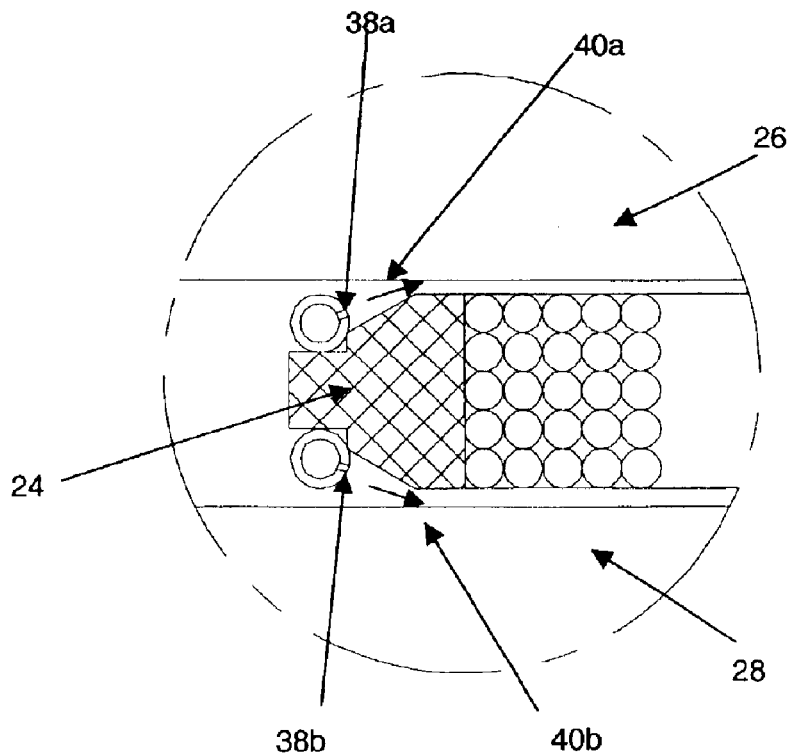
FIG. 4 is an enlarged view of a portion of FIG. 3 illustrating the fluid transmission tubes and air nozzles of the cooling system.

FIG. 4 is an enlarged view of a portion of FIG. 3 illustrating the fluid transmission tubes 36a and 36b and a plurality of apertures or air nozzles 38a, 38b of the cooling system. FIG. 4 is an illustration of the portion of FIG. 3 marked with the letter "A". This illustration shows more clearly the air nozzles 38a formed in the top air tube 36a and the air nozzles 38b formed in the bottom air tube 36b. The air nozzles 38a, 38b are positioned such that they produce air jets 40a, 40b and direct them toward the gaps adjacent to the top and bottom surfaces of the coils 22 respectively, thereby cooling the coil surfaces. Preferably, a number of such air nozzles 38a, 38b are formed next to locations of the coils 22 in the coil bracket 24.

Figure 5:
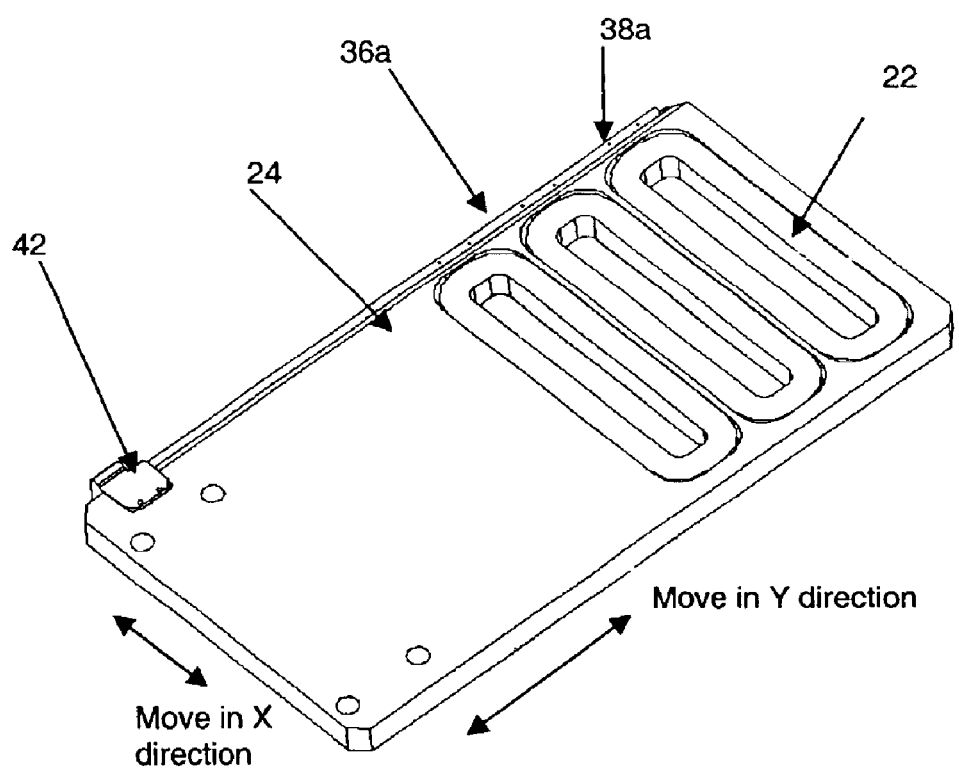
FIG. 5 is an isometric view of a coil bracket including fluid transmission tubes according to the preferred embodiment.

FIG. 5 is an isometric view of a coil bracket 24 including fluid transmission tubes 36a, 36b according to the preferred embodiment. The coil bracket 24 shown in FIG. 5 belongs to the Y motor 14 and is allowed to move in both the X-axis and the Y-axis. Typically, the coil bracket of X motor 12 needs only to move in the X-axis due to the constraint of the X stage 18 only moving along that axis. FIG. 5 shows a coil bracket 24 with three phase coils 22 located near one end of the coil bracket 24. A top air tube 36a is mounted along a length of the top surface of the coil bracket 24. Apertures or air nozzles 38a are located adjacent to the positions of the three phase coils 22 as it is this heat-emitting portion of the coil bracket 24 that experiences the highest temperature rise. At an end of the air tube 36a that is opposite to the end of the coil bracket 24 where the coils 22 are located, there is an air input station 42 through which the air tubes 36a, 36b may receive an external supply of compressed cooling air. A hose (not shown) may be connected to the air station 42 to pump compressed cooling air to the air tubes 36a, 36b.

The air tubes 36a, 36b can be made from a whole host of non-magnetic materials, although stainless steel material is preferred as it is hard and is relatively cheap to fabricate and easily available. A non-magnetic material such as stainless steel is preferred because it avoids the formation of eddy currents that might affect the proper functioning of the linear motor 12, 14. Positions and the numbers of the air nozzles 38a, 38b can be arranged to achieve optimum cooling efficiency.

It would be appreciated that for coil brackets 24 that must move in both the X- and Y-axes, the described embodiment has the benefit of achieving the same cooling efficiency at any position of the coil bracket 24 because the air tubes 36a, 36b that generate the cooling air are fixed on the bracket 24. There is no significant increase in the size of coil bracket 24 due to this design as the air tubes 36a, 36b are relatively tiny and affixed to the bracket 24, and therefore does not noticeably deteriorate the dynamic performance of the motors 12, 14. The air tubes 36a, 36b can have thin walls, thereby saving space and helping to achieve a compact design. The air jets 40a, 40b introduce air directly into the gaps between the coils 22 and coil bracket 24 and the top and bottom magnets 26, 28. Thus, cooling efficiency is increased with a similar air volume or air consumption because of the relatively small size of the air nozzles 38a, 38b generating the compressed air directly onto the coils 22.

The invention described herein is susceptible to variations, modifications and/or additions other than those specifically described and it is to be understood that the invention includes all such variations, modifications and/or additions which fall within the spirit and scope of the above description.

What is claimed is:

1. A cooling system for a motor comprising a fluid transmission tube coupled to a movable component of the motor for movement therewith;

wherein the fluid transmission tub extends adjacent to a heat-emitting surface of the movable component, and is positioned and constructed to direct a cooling fluid from inside the tube onto the heat-emitting surface.

2. A cooling system according to claim 1, wherein the tube is mounted onto the movable component.

3. A cooling system according to claim 1, further including a plurality of apertures on the tube to direct cooling fluid from inside the tube to flow onto the heat-emitting surface.

4. A cooling system according to claim 3, wherein the apertures are located adjacent to the heat-emitting surface.

5. A cooling system according to claim 1, wherein the tube is made of stainless steel.

6. A cooling system according to claim 1, wherein the movable component of the motor is a coil bracket including one or more coils, and the one or more coils are disposed in a magnetic field formed by magnets.

7. A cooling system according to claim 1, wherein the movable component is movable along a first axis as well as a second axis perpendicular to the first axis.

8. A cooling system according to claim 1, wherein the cooling fluid is compressed air.

9. A cooling system according to claim 1, wherein the tube is coupled to an air input station which receives an external supply of cooling fluid.

10. A cooling system according to claim 1, further including a second fluid transmission tube coupled to the movable component of the motor for movement therewith;

wherein the second fluid transmission tube extends adjacent to a second heat-emitting surface of the movable component, and is positioned and constructed to direct a cooling fluid from inside the tube onto the second heat-emitting surface.

11. A method for cooling a motor comprising the steps of:

coupling a fluid transmission tube to a movable component of the motor for movement therewith;

positioning the fluid transmission tube to extend adjacent to a heat-emitting surface of the movable component;

supplying a cooling fluid into the fluid transmission tube, and directing cooling fluid from inside the tube onto the heat-emitting surface.

12. A method according to claim 11, wherein the fluid transmission tube is coupled to the movable component of the motor by mounting the tube onto the movable component.

13. A method according to claim 11, further including the step of forming a plurality of apertures on the tube to direct cooling fluid from inside the tube onto the heat-emitting surface.

14. A method according to claim 13, including locating the apertures adjacent to the heat-emitting surface.

15. A method according to claim 11, wherein the tube is made of stainless steel.

16. A method according to claim 11, wherein the movable component of the motor is a coil bracket including one or more coils, and the one or more coils are disposed in a magnetic filed formed by magnets.

17. A method according to claim 11, wherein the movable component is movable along a first axis as well as a second axis perpendicular to the first axis.

18. A method according to claim 11, wherein the cooling fluid is compressed air.

19. A method according to claim 11, including coupling the tube to an air input station to receive an external supply of cooling fluid.

20. A method according to claim 11, further including the steps of:

coupling a second fluid transmission tube to the movable component of the motor for movement therewith;

positioning the second fluid transmission tube to extend adjacent to a second heat-emitting surface of the movable component;

supplying a cooling fluid into the second fluid transmission tube, and directing cooling fluid from inside the second tube onto the second heat-emitting surface.

* * * * *